United States Patent
Sakakibara

(10) Patent No.: US 7,881,087 B2
(45) Date of Patent: Feb. 1, 2011

(54) MATRIX CONVERTER AND CONTROL METHOD FOR THE MATRIX CONVERTER

(75) Inventor: Kenichi Sakakibara, Kusatsu (JP)

(73) Assignee: Daikin Industries, Ltd., Osaka (JP)

( * ) Notice: Subject to any disclaimer, the term of this patent is extended or adjusted under 35 U.S.C. 154(b) by 230 days.

(21) Appl. No.: 12/298,597

(22) PCT Filed: Apr. 20, 2007

(86) PCT No.: PCT/JP2007/058627

§ 371 (c)(1),
(2), (4) Date: Oct. 27, 2008

(87) PCT Pub. No.: WO2007/125828

PCT Pub. Date: Aug. 11, 2007

(65) Prior Publication Data
US 2009/0257261 A1 Oct. 15, 2009

(30) Foreign Application Priority Data
Apr. 28, 2006 (JP) .............................. 2006-125692

(51) Int. Cl.
H02M 5/00 (2006.01)
H02M 5/275 (2006.01)
H02M 5/293 (2006.01)
(52) U.S. Cl. .................. 363/159; 363/163; 363/165
(58) Field of Classification Search .............. 363/8, 363/157, 159, 160, 163, 164, 165
See application file for complete search history.

(56) References Cited

U.S. PATENT DOCUMENTS

| | | | | |
|---|---|---|---|---|
| 4,648,022 A | * | 3/1987 | Schauder | 363/159 |
| RE38,439 E | * | 2/2004 | Czerwinski | 363/44 |
| 6,995,992 B2 | * | 2/2006 | Wei et al. | 363/34 |
| 7,436,147 B2 | * | 10/2008 | Sato et al. | 318/800 |
| 2009/0059633 A1 | * | 3/2009 | Hara et al. | 363/126 |
| 2009/0175059 A1 | * | 7/2009 | Sakakibara | 363/36 |

FOREIGN PATENT DOCUMENTS

| | | |
|---|---|---|
| JP | 11-341807 A | 12/1999 |
| JP | 2000-299984 A | 10/2000 |

OTHER PUBLICATIONS

Oyama et al.; "VVVF On-line Control of Matrix Converter"; IEE Japan; vol. 116-D; No. 6; Japan 1996.

* cited by examiner

*Primary Examiner*—Adolf Berhane
*Assistant Examiner*—Jeffrey Gblende
(74) *Attorney, Agent, or Firm*—Global IP Counselors

(57) ABSTRACT

An output voltage command signal for outputting a specified three-phase ac output voltage is generated by a line voltage control command signal generating section, and a signal representing a current flow ratio is generated by a current flow ratio generating section based on a specified input current command signal. The output voltage command signal is corrected by a command signal computing section based on the output voltage command signal generated by the line voltage control command signal generating section and the signal representing the current flow ratio generated by the current flow ratio generating section. A PWM conversion signal is generated by a PWM conversion signal generating section based on the corrected output voltage command signal and a carrier signal. Based on the generated PWM conversion signal, a three-phase ac input voltage is converted into a specified three-phase ac input voltage by a conversion section.

7 Claims, 13 Drawing Sheets

UPDATE TIMING:
MINIMUM PHASE LEVEL SIGNAL

UPDATE TIMING:
MAXIMUM PHASE LEVEL SIGNAL

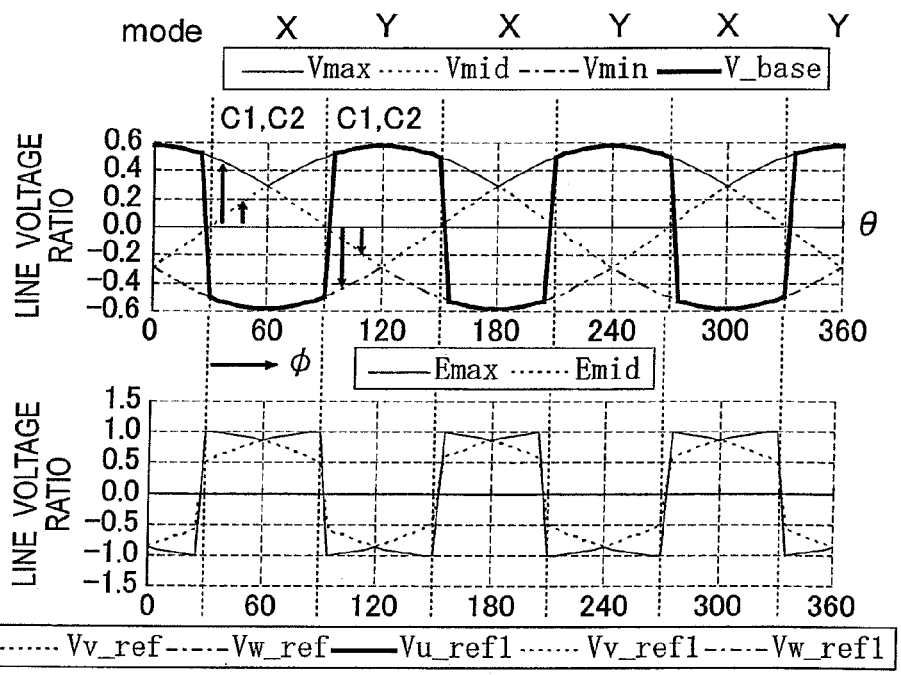
Fig.9A INPUT PHASE VOLTAGE
Fig.9B VIRTUAL DC LINK VOLTAGE
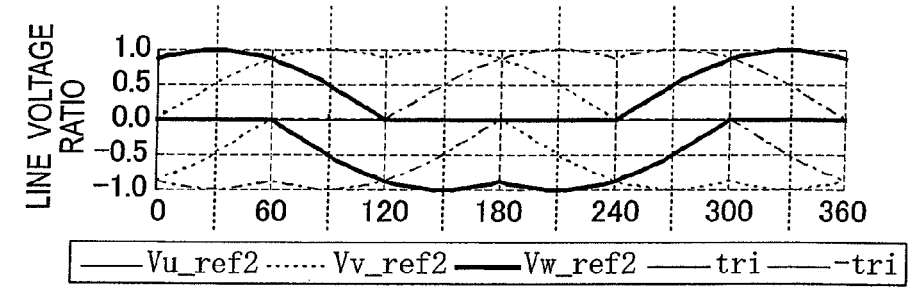
Fig.9C OUTPUT LINE VOLTAGE COMMAND
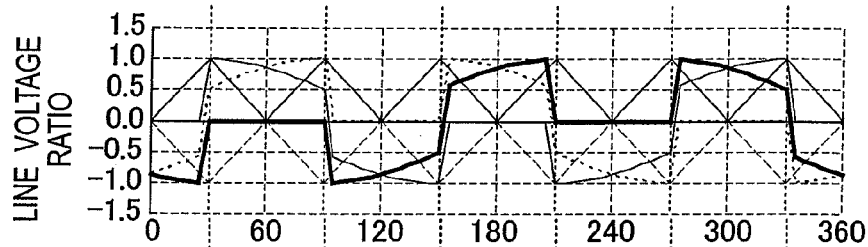
Fig.9D OUTPUT LINE VOLTAGE COMMAND
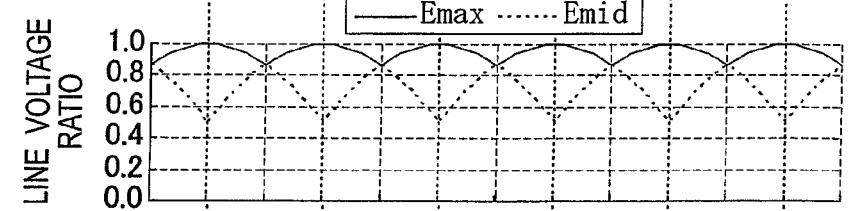
Fig.9E VIRTUAL DC LINK VOLTAGE XY ALTERNATED
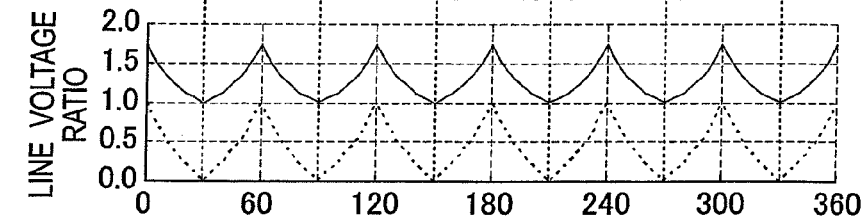
Fig.9F VIRTUAL DC LINK VOLTAGE AVERAGE VALUE CURRENT DISTRIBUTION RATIO

INPUT CURRENT

VIRTUAL DC LINK VOLTAGE

VOLTAGE COMMAND

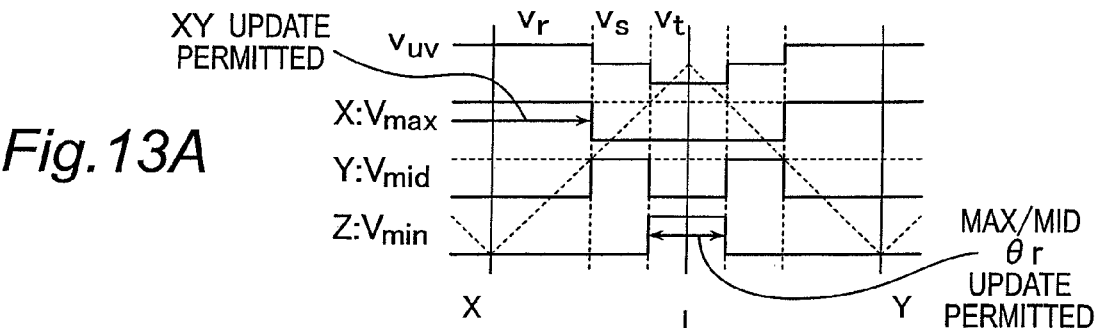
Fig.13A
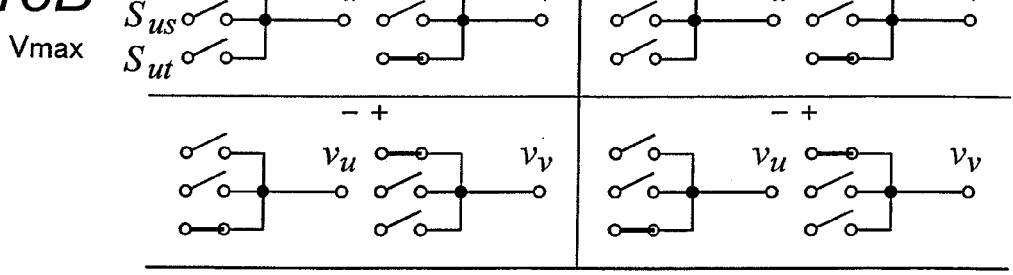
Fig.13B  Vmax
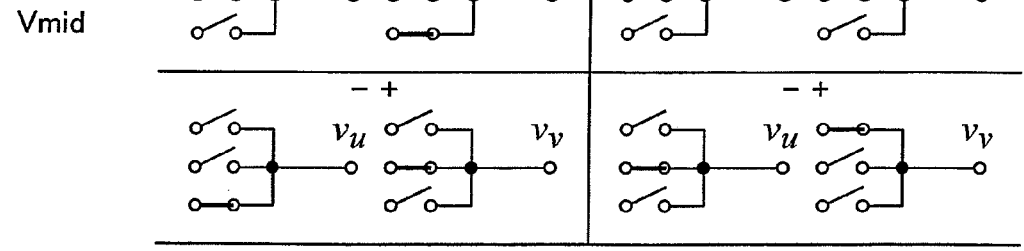
Fig.13C  Vmid
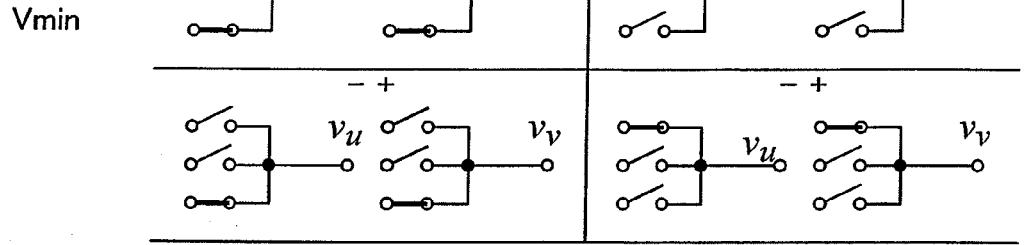
Fig.13D  Vmin

MATRIX CONVERTER AND CONTROL METHOD FOR THE MATRIX CONVERTER

CROSS-REFERENCE TO RELATED APPLICATIONS

This U.S. National stage application claims priority under 35 U.S.C. §119(a) to Japanese Patent Application No. 2006-125692 filed in Japan on Apr. 28, 2006, the entire contents of which are hereby incorporated herein by reference.

TECHNICAL FIELD

The present invention relates to a matrix converter and a control method for the matrix converter. More specifically, the invention relates to a matrix converter and a matrix converter control method for converting a three-phase ac input voltage into a specified three-phase ac output voltage.

BACKGROUND ART

As a typical main circuit construction for inverters, indirect ac power conversion circuits for converting a commercial alternating current into a direct current via a rectifier circuit and a smoothing circuit to obtain an ac output by a voltage-type converter are generally used. Meanwhile, as a method for obtaining an ac output directly from an ac voltage, direct ac power converter apparatuses typified by matrix converters are known. In this case, since large capacitors and reactors for smoothing voltage pulsations by commercial frequencies are unnecessary, converter miniaturization can be expected and therefore the direct ac power converter apparatuses have been increasingly gaining attentions as next-generation power converter apparatuses.

A three-phase to three-phase matrix converter is to obtain ac output voltages of variable voltages and variable frequencies by direct switching of a three-phase ac input voltage. As a typical modulation method, an analog base modulation method in which, with a virtual DC link formed, sinusoidal modulation is performed by carrier comparison is proposed in "VVVF On-Line Control of PWM Cycloconverter", Jun OYAMA and other five, IEEJ Transactions D, IEEJ, Vol. 116 (1996), No. 6, pp. 664-651. Also, a control method for solving current distortion, which is an issue in asynchronism between output voltage command signal and carrier signal, is disclosed in Japanese Patent Publication No. 11-341807 A.

The control methods of "VVVF On-Line Control of PWM Cycloconverter" and Japanese Patent Publication No. 11-341807 A, in either case, is based on an amplitude modulation which is accomplished by introducing a variable that is a current distribution ratio, i.e. a ratio of a mid phase current to a maximum phase current, and by multiplying a factor on each of an output voltage command signal and a carrier signal. Further, the control method of Japanese Patent Publication No. 11-341807 A involves two steps of control for suppressing changeover of switching patterns, which serve as information updating part, so that current distortion in carrier asynchronism is avoided. Due to this, matrix converters of "VVVF On-Line Control of PWM Cycloconverter" and Japanese Patent Publication No. 11-341807 A have an issue that control configuration and computation become more complex.

SUMMARY OF THE INVENTION

It is a primary object of the present invention to provide a matrix converter, as well as a matrix converter control method, which allows the control-related circuit construction to be simplified without involving such computations as ripple computation or carrier amplitude modulation.

In order to achieve the above object, the present invention provides a matrix converter for converting a three-phase ac input voltage into a specified three-phase ac output voltage, comprising:

an output voltage command signal generating section for generating an output voltage command signal to output the specified three-phase ac output voltage;

a current flow ratio generating section for generating a signal representing a current flow ratio based on a specified input current command signal;

a signal correcting section for correcting the output voltage command signal based on the output voltage command signal generated by the output voltage command signal generating section and the signal representing the current flow ratio generated by the current flow ratio generating section;

a PWM conversion signal generating section for generating a PWM conversion signal based on the output voltage command signal corrected by the signal correcting section and a carrier signal; and a conversion section for converting the three-phase ac input voltage into the specified three-phase ac output voltage based on the PWM conversion signal generated by the PWM conversion signal generating section, wherein given the input current command signals are represented by $i_r^*$, $i_s^*$, $i_t^*$ and a voltage command is represented by $V_s^*$, assuming the lowest voltage phase as a reference voltage when a polarity of a mid phase out of the output voltage command signal is positive or the highest voltage phase as a reference voltage when the polarity of the mid phase out of the output voltage command signal is negative, the current flow ratio generating section (12) generates the current flow ratio' of the maximum phase by $$V_s^* \frac{2}{\sqrt{3}} \mathrm{mid}(|i_r^*|, |i_s^*|, |i_t^*|)$$

and generates a sum of the current flow ratio of the maximum phase and the current flow ratio of the mid phase by $$V_s^* \frac{2}{\sqrt{3}} \mathrm{max}(|i_r^*|, |i_s^*|, |i_t^*|).$$

According to this matrix converter, based on the output voltage command signal generated by the output voltage command signal generating section and the signal representing the current flow ratio generated by the current flow ratio generating section, the output voltage command signal is corrected by the signal correcting section. Based on the corrected output voltage command signal and the carrier signal, the PWM conversion signal is generated by the PWM conversion signal generating section. With such a modulation method by input current flow ratio, a constant average virtual dc link voltage can be obtained and, as a result, the control-related circuit construction can be simplified without involving such computations as ripple computation or carrier amplitude modulation.

Also, according to this matrix converter, the current flow ratio of the maximum phase as well as the sum of the current flow ratio of the maximum phase and the current flow ratio of the mid phase are generated by the current flow ratio generating section based on the input current command signal, and the output voltage command signal is corrected by using the current flow ratios. Thus, the virtual dc link voltage can be maintained as a constant dc voltage.

In accordance with one aspect of the present invention, given that the input current command signals are represented by $i_r^*$, $i_s^*$, $i_t^*$ and that a phase angle of the input current command signals $i_r^*$, $i_s^*$, $i_t^*$ relative to the output voltage command signal is represented by $\phi$, the current flow ratio generating section generates the current flow ratio of the maximum phase by $$\frac{2}{\sqrt{3}}\text{mid}(|i_r^*|, |i_s^*|, |i_t^*|) = \frac{2}{\sqrt{3}}\sin(\pi/3 - \phi) \quad \text{(where } \pi/6 > \phi \geq 0\text{)}$$

$$= \frac{2}{\sqrt{3}}\sin\phi \quad \text{(where } \pi/3 > \phi \geq \pi/6\text{)}$$

and generates a sum of the current flow ratio of the maximum phase and the current flow ratio of the mid phase by $$\frac{2}{\sqrt{3}}\max(|i_r^*|, |i_s^*|, |i_t^*|) = \frac{2}{\sqrt{3}}(\sin\phi + \sin(\pi/3 - \phi)).$$

With this arrangement, in generating a current flow ratio based on the input current command signal, the current flow ratio generating section looks up to a single sine table, allowing further simplification to be achieved.

In accordance with another aspect of the present invention, the carrier signal is a triangle wave signal having a generally constant amplitude.

With this arrangement, the matrix converter is easily applicable to digital counters and comparators by virtue of its constant carrier amplitude, and suitable for digital control systems by virtue of its capability of maintaining the PWM modulation resolution constant. Moreover, the matrix converter, in which the triangle wave signal suitable for PWM modulation is used as the carrier signal, allows the circuit for pulse width modulation to be simplified.

In accordance with another aspect of the present invention, the carrier signal is a sawtooth wave signal having a generally constant amplitude.

With this arrangement, the matrix converter is easily applicable to digital counters and comparators by virtue of its constant carrier amplitude, and suitable for digital control systems by virtue of its capability of maintaining the PWM modulation resolution constant. Moreover, the matrix converter, in which the sawtooth wave signal is used as the carrier signal, allows carrier generation and modulation processing to be simplified.

In accordance with another aspect of the present invention, the matrix converter further comprises:

a holding section for holding the output voltage command signal corrected by the signal correcting section and power supply voltage information, wherein the holding section updates the output voltage command signal and the power supply voltage information at a timing of a peak of the carrier signal, and the PWM conversion signal generating section generates the PWM conversion signal based on the output voltage command signal and the power supply voltage information held by the holding section.

With this arrangement, update of the output voltage command signal and the power supply voltage information is synchronized at the timing of the peak of the carrier signal, thus making it possible to prevent occurrence of current distortions as well as to achieve simplification of the control-related construction.

According to the present invention, there is provided a matrix converter control method for converting a three-phase ac input voltage into a specified three-phase ac output voltage, comprising the steps of:

generating an output voltage command signal for outputting the specified three-phase ac output voltage by an output voltage command signal generating section;

generating a signal representing a current flow ratio by a current flow ratio generating section based on a specified input current command signal;

correcting, by a signal correcting section, the output voltage command signal generated by the output voltage command signal generating section based on the output voltage command signal and the signal representing the current flow ratio generated by the current flow ratio generating section;

generating a PWM conversion signal by a PWM conversion signal generating section based on the output voltage command signal corrected by the signal correcting section and a carrier signal; and converting the three-phase ac input voltage into the specified three-phase ac output voltage by a conversion section based on the PWM conversion signal generated by the PWM conversion signal generating section, wherein given the input current command signals are represented by $i_r^*$, $i_s^*$, $i_t^*$ and a voltage command is represented by $V_s^*$, assuming the lowest voltage phase as a reference voltage when a polarity of a mid phase out of the output voltage command signal is positive or the highest voltage phase as a reference voltage when the polarity of the mid phase out of the output voltage command signal is negative, the current flow ratio generating section (12) generates the current flow ratio of the maximum phase by $$V_s^* \frac{2}{\sqrt{3}}\text{mid}(|i_r^*|, |i_s^*|, |i_t^*|)$$

and generates a sum of the current flow ratio of the maximum phase and the current flow ratio of the mid phase by $$V_s^* \frac{2}{\sqrt{3}}\max(|i_r^*|, |i_s^*|, |i_t^*|).$$

In this matrix converter control method, based on the output voltage command signal generated by the output voltage command signal generating section and the signal representing the current flow ratio generated by the current flow ratio generating section, the output voltage command signal is corrected by the signal correcting section. Based on the corrected output voltage command signal and the carrier signal, the PWM modulation signal is generated by the PWM modulation signal generating section. With such a modulation method by input current flow ratio, a constant average virtual dc link voltage can be obtained and, as a result, the control-related circuit construction can be simplified without involving such computations as ripple computation or carrier amplitude modulation.

As apparent from the above description, according to the matrix converter and the matrix converter control method of the invention, there can be realized a matrix converter in which the control-related circuit construction can be simplified without involving such computations as ripple computation or carrier amplitude modulation.

BRIEF DESCRIPTION OF THE DRAWINGS

FIGS. 9A-9F are charts showing waveforms of individual sections of the matrix converter;

FIGS. 13A-13D are charts showing effects of carrier cycle in various switching states;

DETAILED DESCRIPTION OF THE INVENTION

Hereinbelow, the matrix converter and the matrix converter control method according to the present invention will be described in detail by way of embodiments thereof illustrated in the accompanying drawings.

Figure 1:
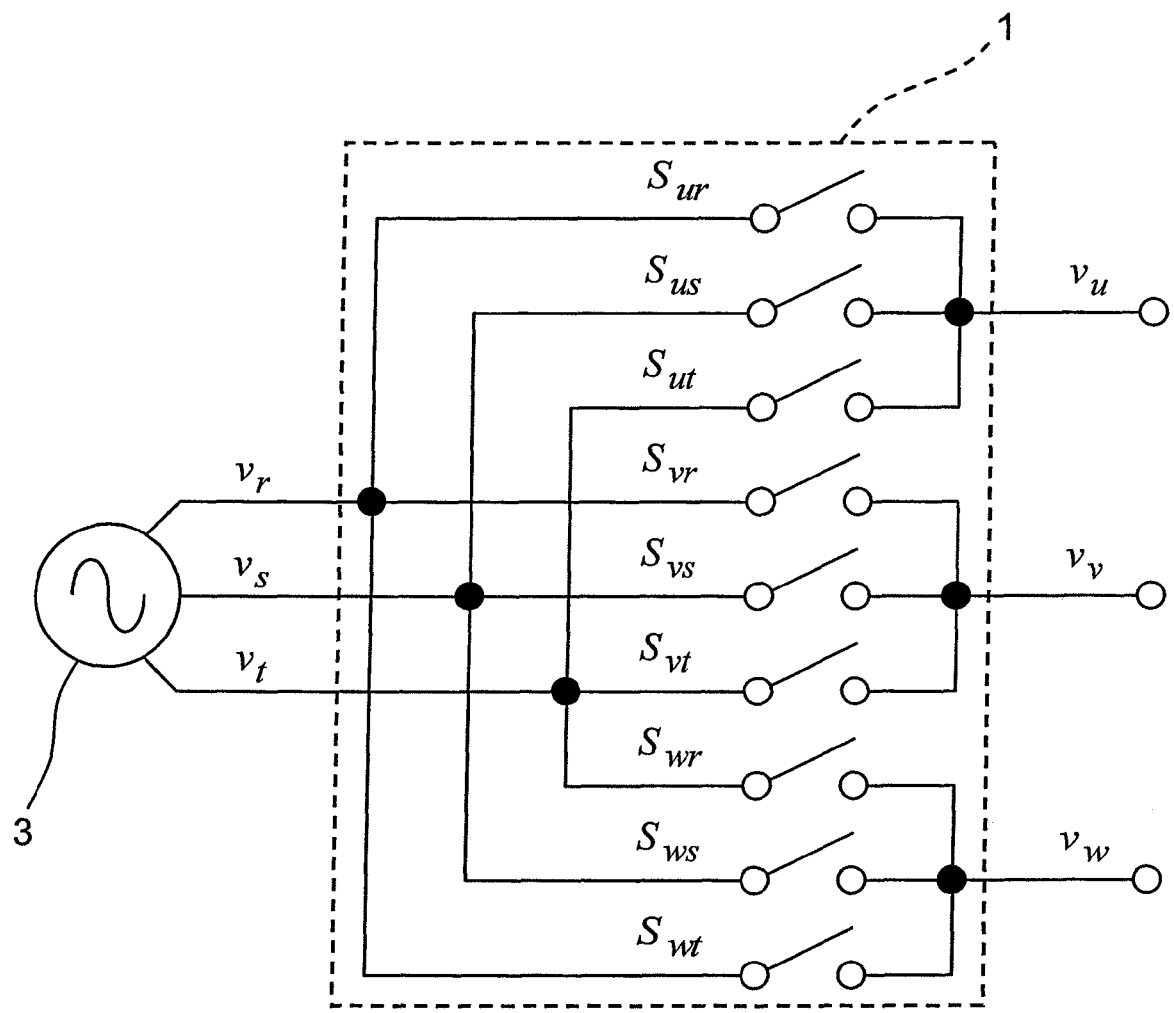
FIG. 1 is a constructional view of a conversion section of a matrix converter according to an embodiment of the present invention.

FIG. 1 is a constructional view of a matrix converter according to one embodiment of the invention. As shown in FIG. 1, the three-phase to three-phase matrix converter has three ac switches connected to individual phases of a three-phase power supply, respectively, in steps of output phases, with a view to obtaining variable voltages and variable frequencies by controlling the connection phase and time as required.

This matrix converter, as shown in FIG. 1, includes a converter section 1 composed of switches $S_{ur}$, $S_{us}$, $S_{ut}$, $S_{vr}$, $S_{vs}$, $S_{vt}$, $S_{wr}$, $S_{ws}$, $S_{wt}$, and a control section 2 (shown in FIG. 2) for outputting signals to turn on and off the switches $S_{ur}$, $S_{us}$, $S_{ut}$, $S_{vr}$, $S_{vs}$, $S_{vt}$, $S_{wr}$, $S_{ws}$, $S_{wt}$ of the converter section 1.

In the converter section 1, a phase voltage $v_r$ out of three-phase ac input voltages derived from a three-phase ac power supply 3 is inputted to one end of each of the switches $S_{ur}$, $S_{vr}$, $S_{wr}$, a phase voltage $v_s$ out of the three-phase ac input voltages is inputted to one of each of $S_{us}$, $S_{vs}$, $S_{ws}$, and a phase voltage $v_t$ out of the three-phase ac input voltages is inputted to one end of each of $S_{ut}$, $S_{vt}$, $S_{wt}$, respectively. The other ends of the switches $S_{ur}$, $S_{us}$, $S_{ut}$ are connected to an output terminal of the phase voltage $v_u$, the other ends of the switches $S_{vr}$, $S_{vs}$, $S_{vt}$ are connected to an output terminal of the phase voltage $v_r$, and the other ends of the switches $S_{wr}$, $S_{ws}$, $S_{wt}$ are connected to an output terminal of the phase voltage $v_w$.

Figure 2:
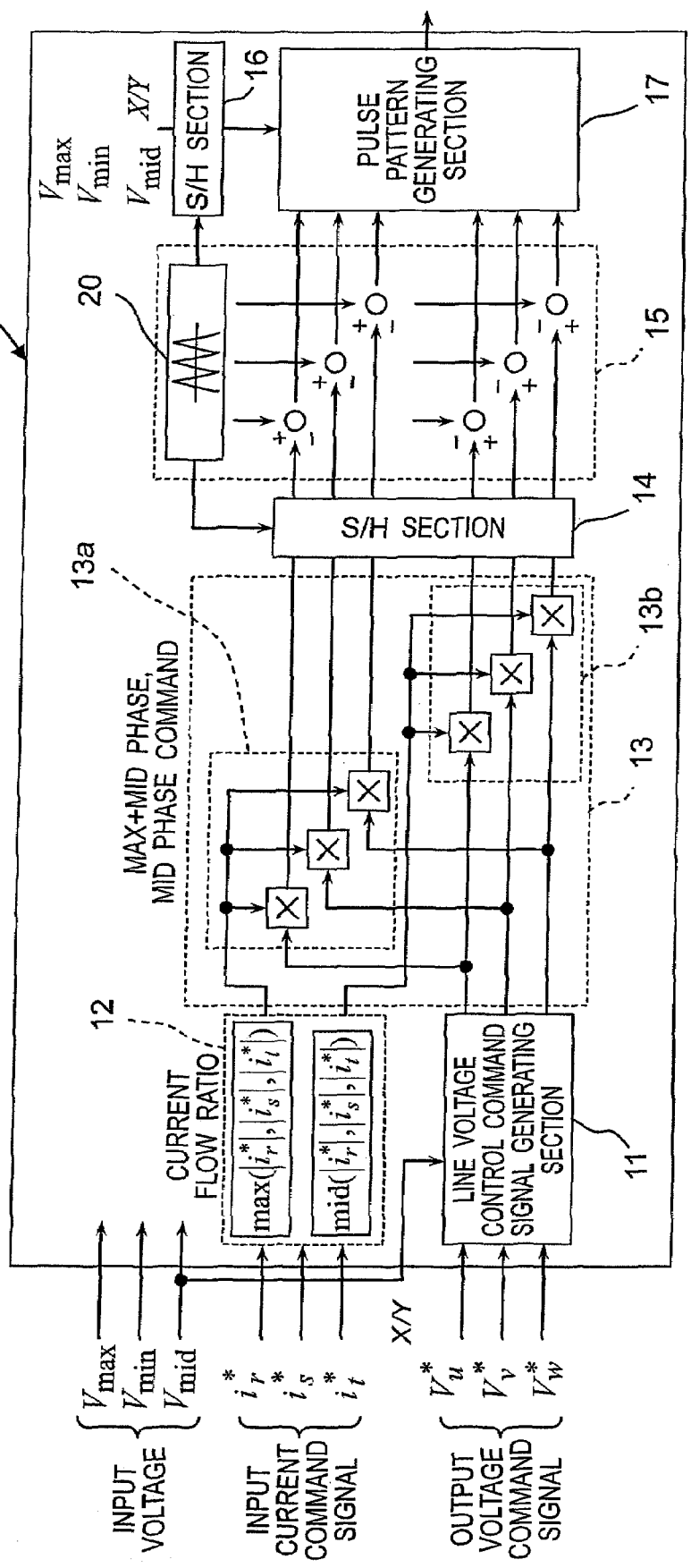
FIG. 2 is a block diagram of a control section of the matrix converter.

Also, FIG. 2 shows a block diagram of the control section 2.

The control section 2, as shown in FIG. 2, includes: a line voltage control command signal generating section 11 as an example of an output voltage command signal generating section for generating a line voltage control command signal based on output voltage command signals $V_u^*$, $V_v^*$, $V_w^*$ and an input voltage $V_{mid}$; a current flow ratio generating section 12 for computing a current flow ratio based on input current command signal $i_r^*$, $i_s^*$, $i_t^*$; a command signal computing section 13 as an example of a signal correcting section for computing a maximum phase + mid phase command signal and a mid phase command signal based on a line voltage control command signal generated by the line voltage control command signal generating section 11 and a current flow ratio computed by the current flow ratio generating section 12; an S/H (sample-hold) section 14 for updating and holding a maximum phase + mid phase command signal and a mid phase command signal derived from the command signal computing section 13 at a timing of a peak of a carrier signal; a carrier comparison section 15 which has a carrier signal generation circuit 20 for generating the carrier signal and which performs a comparison between the maximum phase + mid phase command signal held by the S/H section 14 and the carrier signal, as well as a comparison between the mid phase command signal and the carrier signal; an S/H (sample-hold) section 16 for updating and holding power supply voltage phase information $V_{max}$, $V_{mid}$, $V_{min}$ and a reference voltage X/Y at a timing of a peak of a carrier signal derived from the carrier signal generation circuit 20; and a pulse pattern generating section 17 for generating a pulse pattern (PWM conversion signal) for turning on and off the switches $S_{ur}$, $S_{us}$, $S_{ut}$, $S_{vr}$, $S_{vs}$, $S_{vt}$, $S_{wr}$, $S_{ws}$, $S_{wt}$ based on comparison results from the carrier comparison section 15 and the power supply voltage phase information $V_{max}$, $V_{mid}$, $V_{min}$ and the reference voltage X/Y held in the S/H section 16.

The command signal computing section 13 has a maximum phase + mid phase command signal computing section 13a for multiplying a line voltage control command signal derived from the line voltage control command signal generating section 11 by a maximum phase + mid phase command signal, and a mid phase command signal computing section 13b for multiplying the line voltage control command signal by a mid phase command signal.

The carrier comparison section 15 and the pulse pattern generating section 17 constitute a PWM conversion signal generating section. Also, the S/H section 14 and the S/H section 16 constitute a hold section.

COMPARATIVE EXAMPLE

Figure 8:
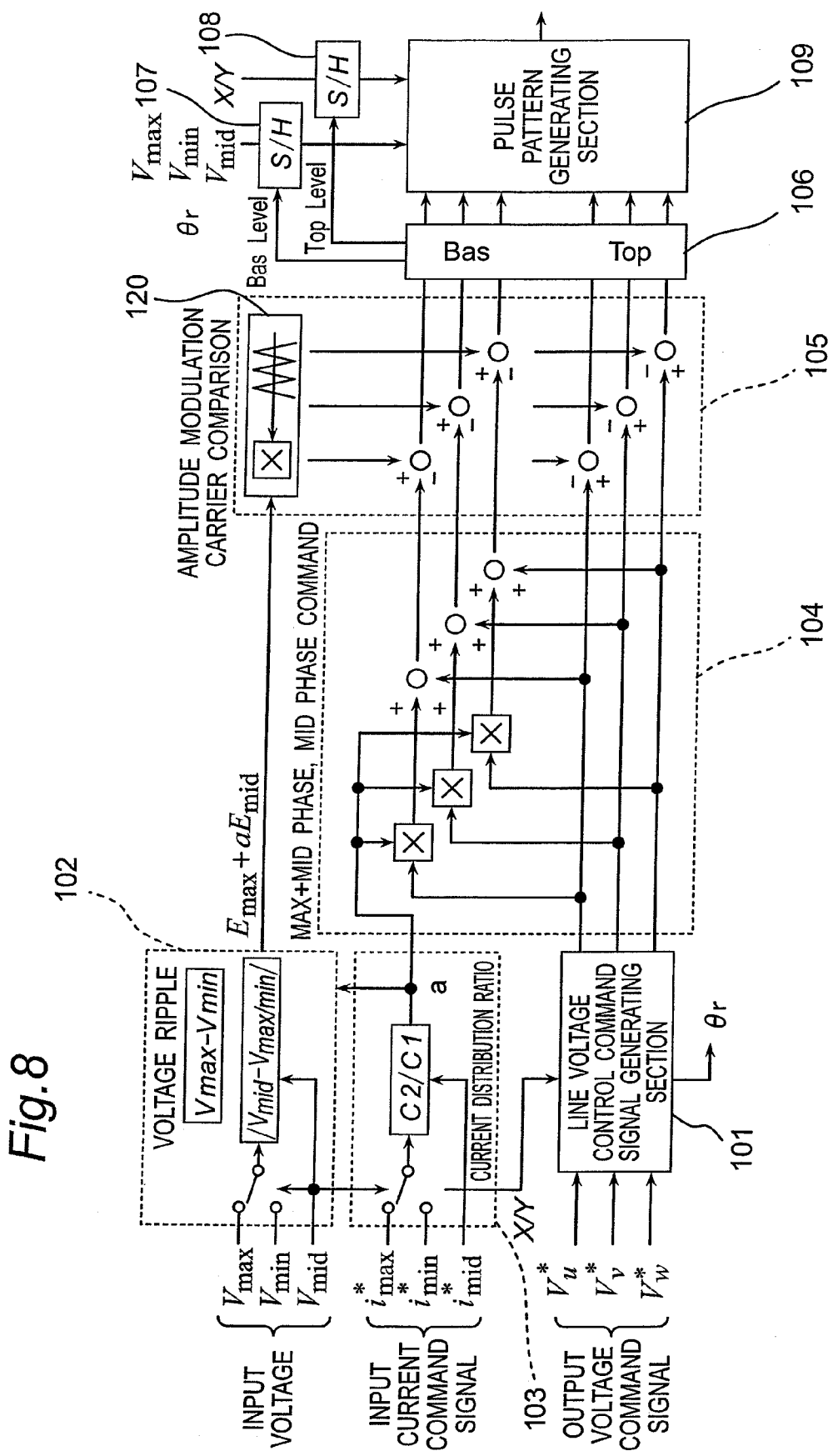
FIG. 8 is a block diagram of a control section in a matrix converter which is a comparative example.

FIG. 8 shows a block diagram of a control section in a matrix converter which is a comparative example. It is noted that the matrix converter shown in FIG. 8 is given for an easier understanding of the present invention, and neither a known or prior art nor a matrix converter of the invention.

The control section of the matrix converter in this Comparative Example, as shown in FIG. 8, includes: a line voltage control command signal generating section 101 for generating a line voltage control command signal based on output voltage command signals $V_u^*$, $V_v^*$, $V_w^*$ and a current distribution ratio 'a'; a voltage ripple computing section 102 for computing a voltage ripple based on input voltages $V_{max}$, $V_{mid}$, $V_{min}$; a current distribution ratio computing section 103 for computing a current distribution ratio 'a' based on input current command signals $i_{max}^*$, $i_{mid}^*$, $i_{min}^*$; a command signal computing section 104 for computing maximum phase + mid phase command signal and a maximum phase command signal based on a line voltage control command signal generated by the line voltage control command signal generating section 11 and a current distribution ratio 'a' computed by the current distribution ratio computing section 103; a carrier comparison section 105 which has a carrier signal generation circuit 120 for generating a carrier signal and which performs a comparison between the maximum phase + mid phase command signal derived from the command signal computing section 104 and the carrier signal, as well as a comparison between the maximum phase command signal and the carrier signal; a switching section 106 for outputting a switching signal based on a comparison result from the carrier comparison section 105; an S/H section 107 for updating and holding voltage command phase information θr derived from the line voltage control command signal generating section 101 and power supply voltage phase information $V_{max}$, $V_{mid}$, $V_{min}$ based on a Bas-level switching signal from the switching section 106; an S/H section 108 for updating and holding a reference voltage X/Y based on a Top-level switching signal from the switching section 106; and a pulse pattern generating section 109 for generating a pulse pattern (PWM conversion signal) to turn on and off the switches $S_{ur}$, $S_{us}$, $S_{ut}$, $S_{vr}$, $S_{vs}$, $S_{vt}$, $S_{wr}$, $S_{ws}$, $S_{wt}$ of the conversion section based on a comparison result from the carrier comparison section 105 as well as the voltage command phase information θr and the power supply voltage phase information $V_{max}$, $V_{mid}$, $V_{min}$ and the reference voltage X/Y held in the S/H sections 107, 108.

The carrier signal generation circuit 120 of the carrier comparison section 105 performs amplitude modulation of a carrier signal based on a voltage ripple signal derived from the voltage ripple computing section 102.

FIGS. 9A-9F show waveforms of individual sections by the matrix converter control method of the Comparative Example, where the input power factor is assumed to be 1 and the output frequency is assumed as equal to that of the power supply for simplicity's sake. In this case, with regard to a magnitude relationship of three-phase ac potential, the mid phase potential is inverted in polarity in every 60-degree phase angle. Therefore, under the condition that based on the polarity of the mid phase voltage (positive: region X, negative: region Y), a reference waveform (minimum phase for the region X, maximum phase for the region Y) is changed, potentials with respect to the reference waveform are $$X: E_{max} = V_{max} - V_{min}, E_{mid} = V_{mid} - V_{min}$$
$$Y: E_{max} = V_{min} - V_{max}, E_{mid} = V_{mid} - V_{max}$$

where it is understood that two potentials can be obtained.

Meanwhile, with respect to the command signal, a two-phase modulation waveform resulting from dividing a three-phase voltage command by a minimum phase is used. In this case, in the region Y, in which the potential becomes negative, the polarity is inverted to change over the waveform to one resulting from division by the maximum phase. From matching of the output voltage polarity in this way, the virtual dc link voltage results in a relationship expressed by the following equations:

$$X: E_{max} = V_{max} - V_{min}, E_{mid} = V_{mid} - V_{min}$$
$$Y: E_{max} = -(V_{min} - V_{max}), E_{mid} = -(V_{mid} - V_{max})$$

where pulsating currents by two potentials shown in FIG. 9B are modulated.

Next, the method for apportioning the command signal into two signals is defined by the current distribution ratio, which is a ratio of the mid phase current to the maximum phase current. Given a semi-cycle T of the carrier signal, a time $T_0$ from a peak of the carrier signal to a switching to the mid phase, and a time $T_1$ from a peak of the carrier signal to a switching to the maximum phase, the current distribution ratio 'a' is expressed by $$a = C2/C1$$
$$C1 = T - T_1$$
$$C2 = T_1 - T_0.$$

In this case, because of the expression with a power factor of 1, the ratio of phase voltage is used in FIG. 9A.

Time ratios of connection to the maximum phase voltage and the mid phase voltage are determined by the following equations. In this connection, since the maximum phase value is multiplied by a voltage command value and the mid phase value is multiplied by a current distribution ratio, an average virtual dc link voltage is defined by a value resulting from addition of the mid voltage to the maximum voltage at a current distribution ratio.

| | | | | |
|---|---|---|---|---|
| Max. phase | : | $(T - T_1)/T$ | $= V_s^*/V_{tri}$ | (1) |
| Mid phase | : | $(T_1 - T_0)/T$ | $= aV_s^*/V_{tri}$ | (2) |
| Max.+mid phase | : | $(T - T_0)/T$ | $= (1 + a)V_s^*/V_{tri}$ | (3) |
| Carrier amplitude | : | $V_{tri}$ | $= E_{max} + aE_{mid}$ | |

In this case, for the region X, the phase of the lowest voltage out of the output voltage command signals $V_u^*$, $V_v^*$, $V_w^*$ is assumed as the reference voltage $V_s^*$ while for the region Y, a voltage command in which the phase of the highest voltage out of the output voltage command signals $V_u^*$, $V_v^*$, $V_w^*$ is taken as the reference voltage is assumed as $V_s^*$.

Figure 10:
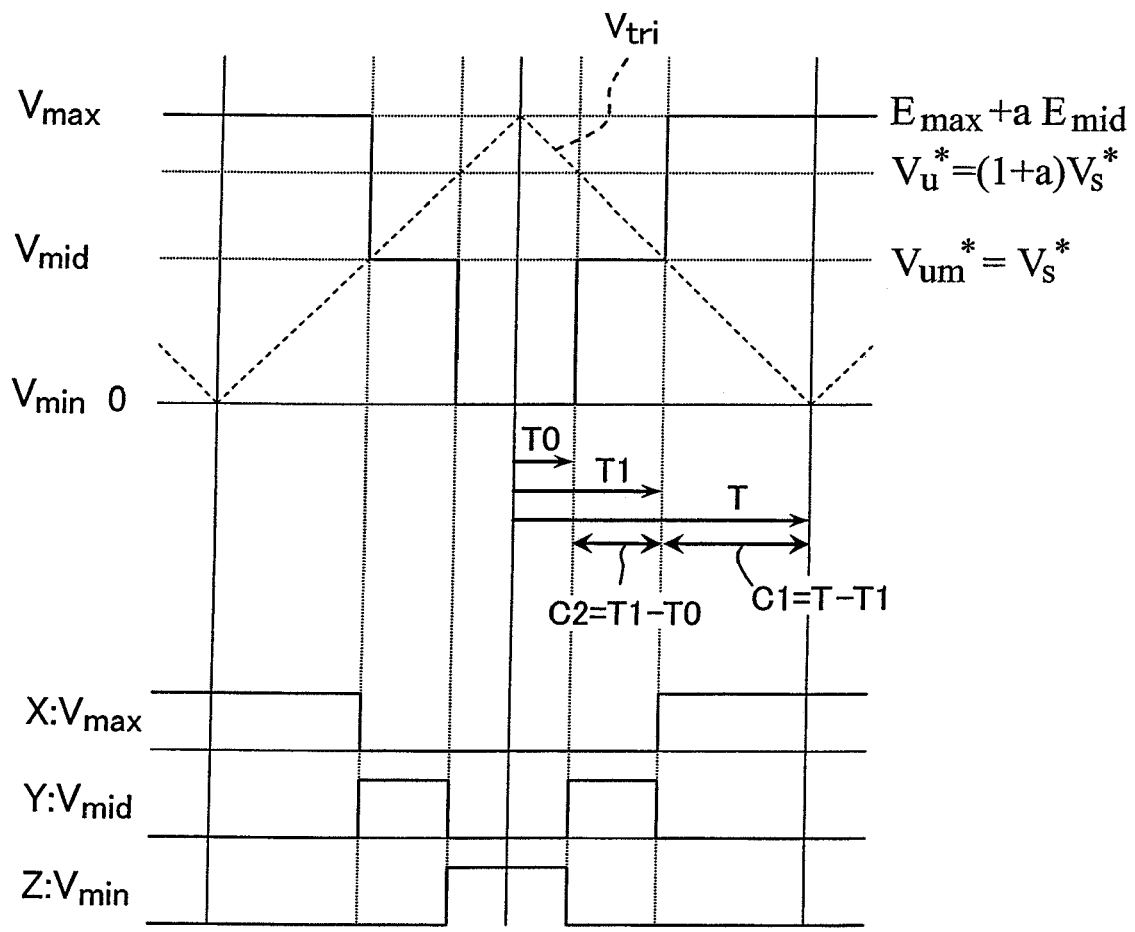
FIG. 10 is a chart showing turn-on timing of the matrix converter.

Therefore, the pulsating current is compensated by amplitude modulation of the carrier signal with the average virtual dc link voltage, and then PWM modulation through carrier comparison is performed with two command signals at conduction timing shown in FIG. 10. In this case, patterns of gating to one-phase portions of the maximum, mid and minimum phases are isolated by using the following logical equations:

| | | | | |
|---|---|---|---|---|
| Max. phase | : | X | $=$ | $(V_{tri} < V_s^*)$ |
| Min. phase | : | Z | $=$ | $(V_{tri} > (1 + a)V_s^*)$ |
| Mid phase | : | Y | $=$ | $\overline{(X \cup Z)}.$ |

Figure 11:
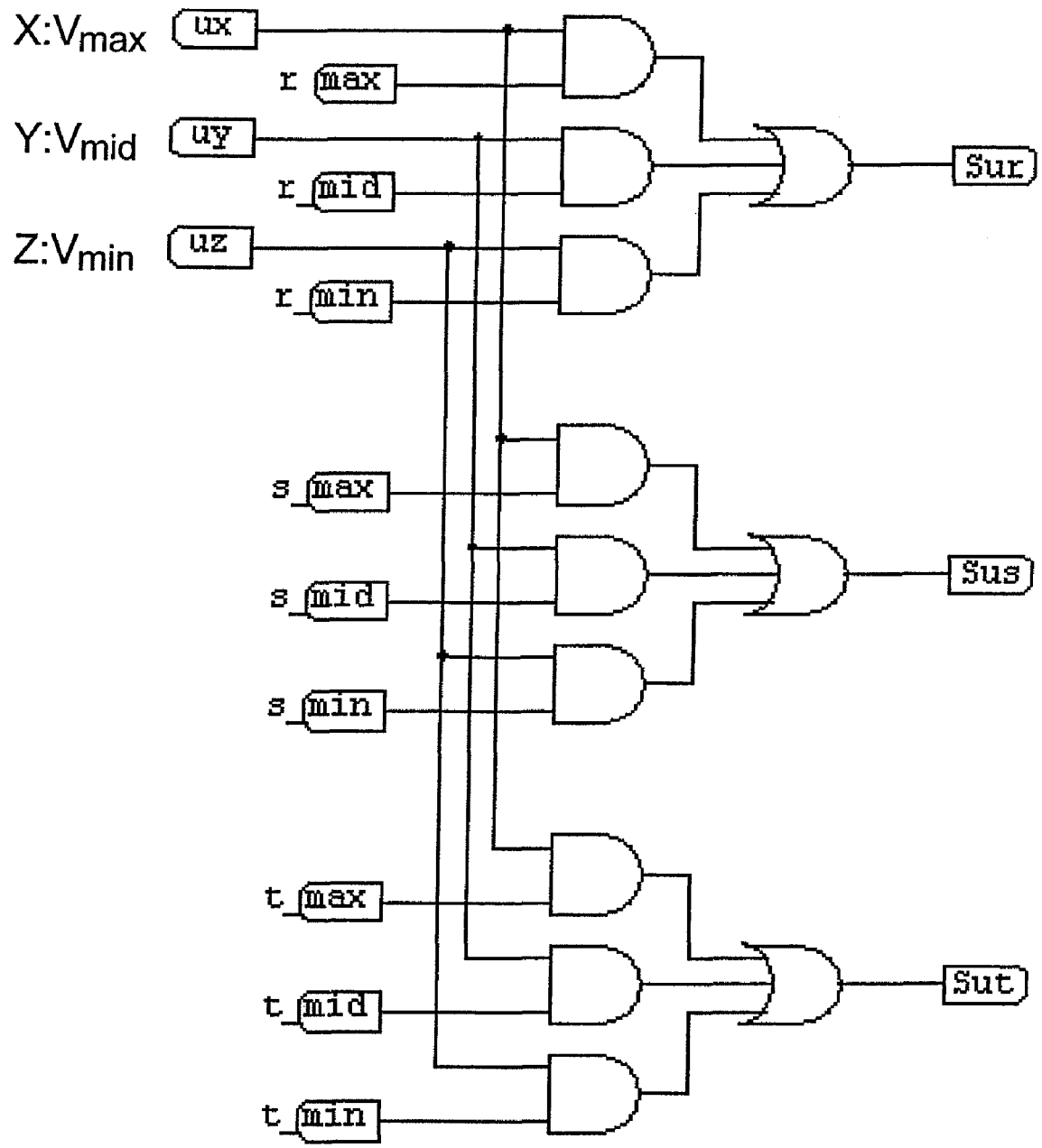
FIG. 11 is a diagram showing a logic circuit of the matrix converter.
Figure 12A:
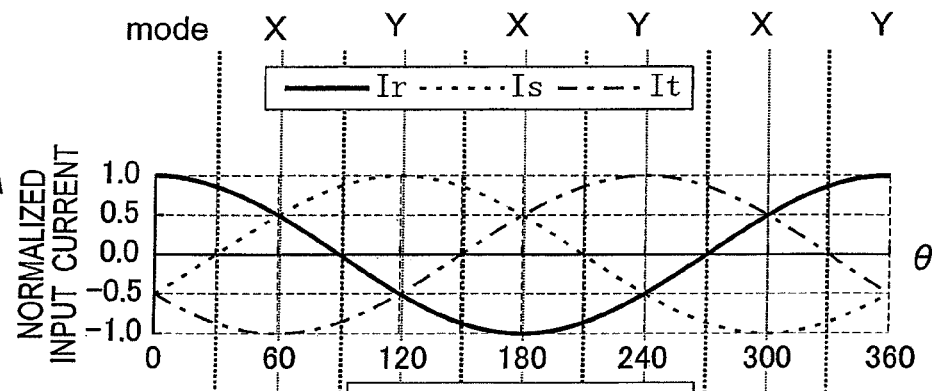
FIGS. 12A-12D are charts showing signal update timing of occurrence of distortion.
Figure 12B:
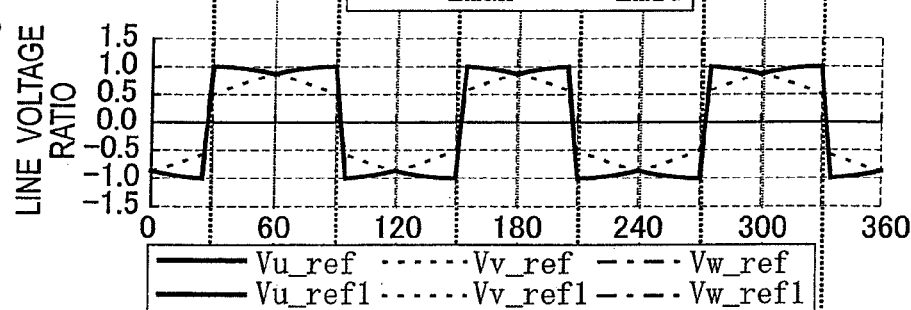
Figure 12C:
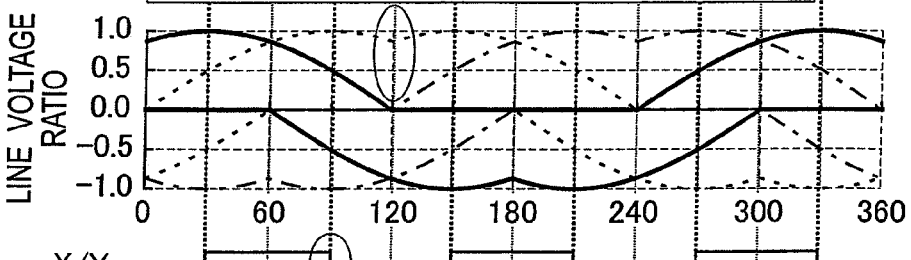
Figure 12D:
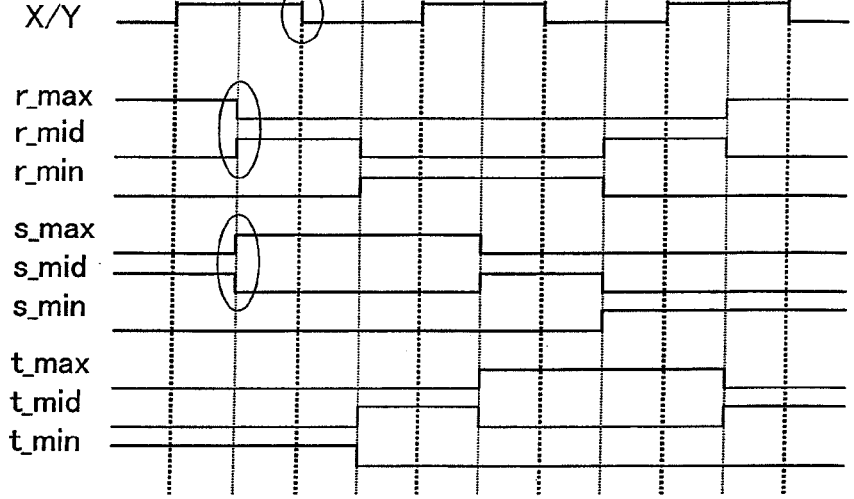

With respect to the input phase of connection, as shown in FIG. 11, gate signals for the respective switches are apportioned by logical circuits based on logic signals showing the magnitude relationships among the individual phases.

In the matrix converter of this Comparative Example, since modulation is performed by multiplying both command signal and carrier signal by factors with the use of the current distribution ratio 'a', there has been a problem that the control configuration or computations would be complicated.

In the matrix converter of the Comparative Example, the ratio of the mid phase to the maximum phase would be defined as the current distribution ratio. However, in the present invention, the current is distributed with a normalized current value.

FIGS. 3A-3F show normalized current waveforms in the matrix converter of the invention, where it is assumed that shunting with C1 is applied to the maximum phase and shunting with C2 is applied to the mid phase. Since the maximum phase is assumed as 1 in the method of the foregoing Comparative Example, multiplying by a factor of $2/\sqrt{3}$ to set 1 on the boundary of the region X and the region Y causes flow ratios among the individual phases to be expressed by the following relationship:

Max. phase : $(T - T_1)/T = V_s^* \frac{2}{\sqrt{3}} \text{mid}(|i_r^*|, |i_s^*|, |i_t^*|)$ (4)

Mid phase : $(T_1 - T_0)/T = V_s^* \frac{2}{\sqrt{3}} \text{min}(|i_r^*|, |i_s^*|, |i_t^*|)$ (5)

Max.+mid phase : $(T - T_0)/T = V_s^* \frac{2}{\sqrt{3}} \text{max}(|i_r^*|, |i_s^*|, |i_t^*|)$. (6)

In this case, for the region X, the phase of the lowest voltage out of the output voltage command signals $V_u^*, V_v^*, V_w^*$ is assumed as the reference voltage $V_s^*$, while for the region Y, a voltage command in which the phase of the highest voltage out of the output voltage command signals $V_u^*, V_v^*, V_w^*$ is taken as the reference voltage is assumed as $V_s^*$. Although a sum of flow ratios of the maximum phase and the mid phase becomes over 1, the voltage control rate of the maximum voltage command results from the virtual dc link voltage waveform as:

$$\cos 30° = \frac{\sqrt{3}}{2}$$

Thus, the maximum value of flow ratios results in 1 eventually.

Figure 3:
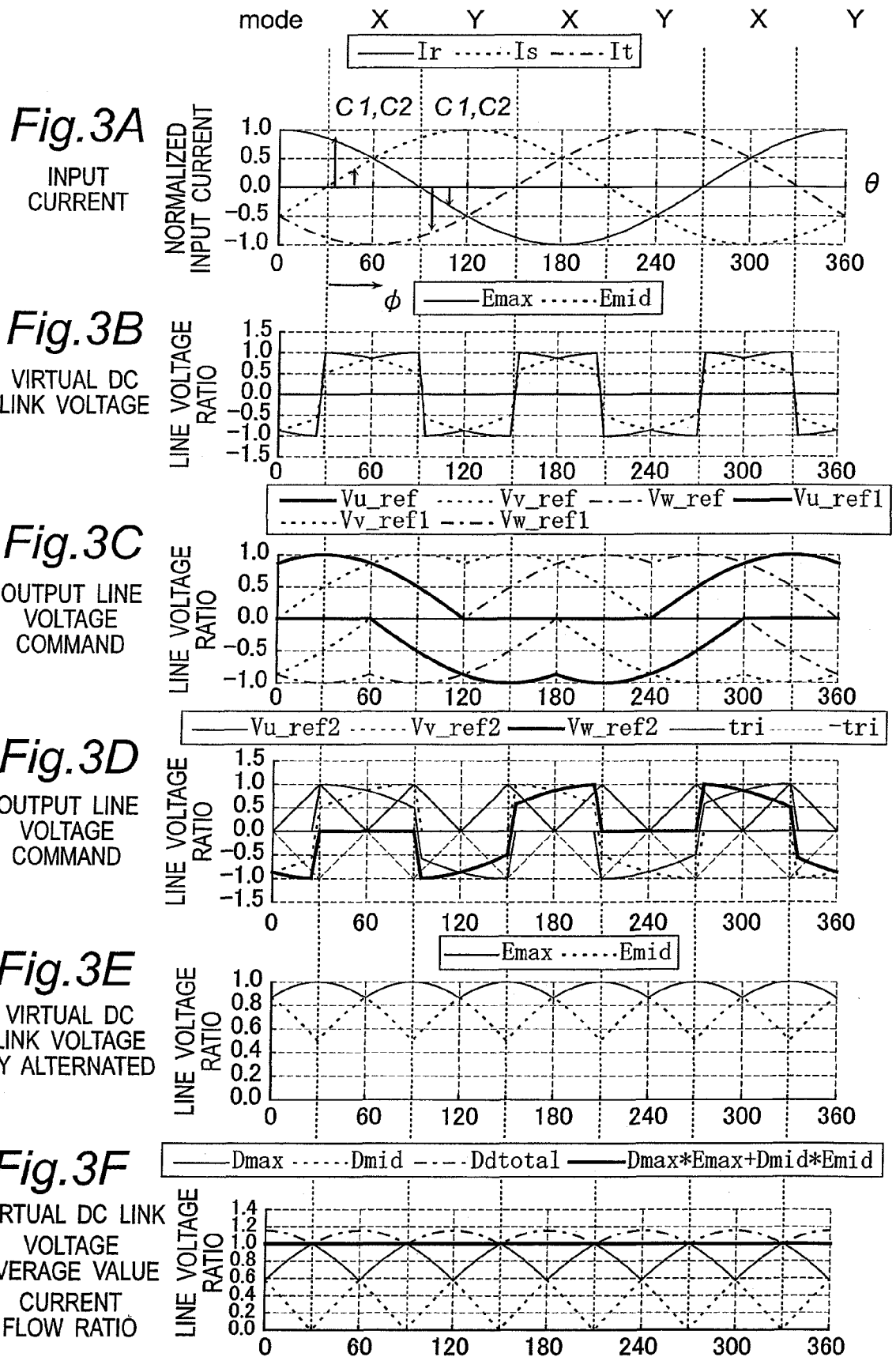
FIGS. 3A-3F are charts showing waveforms of individual sections of the matrix converter.

Multiplying two potentials of the virtual dc link by the above flow ratio results in an average virtual dc link voltage waveform. Since a constant dc voltage is obtained as shown in FIG. 3F, it can be understood that amplitude modulation of the carrier signal as in the Comparative Example is unnecessary.

Figure 4:
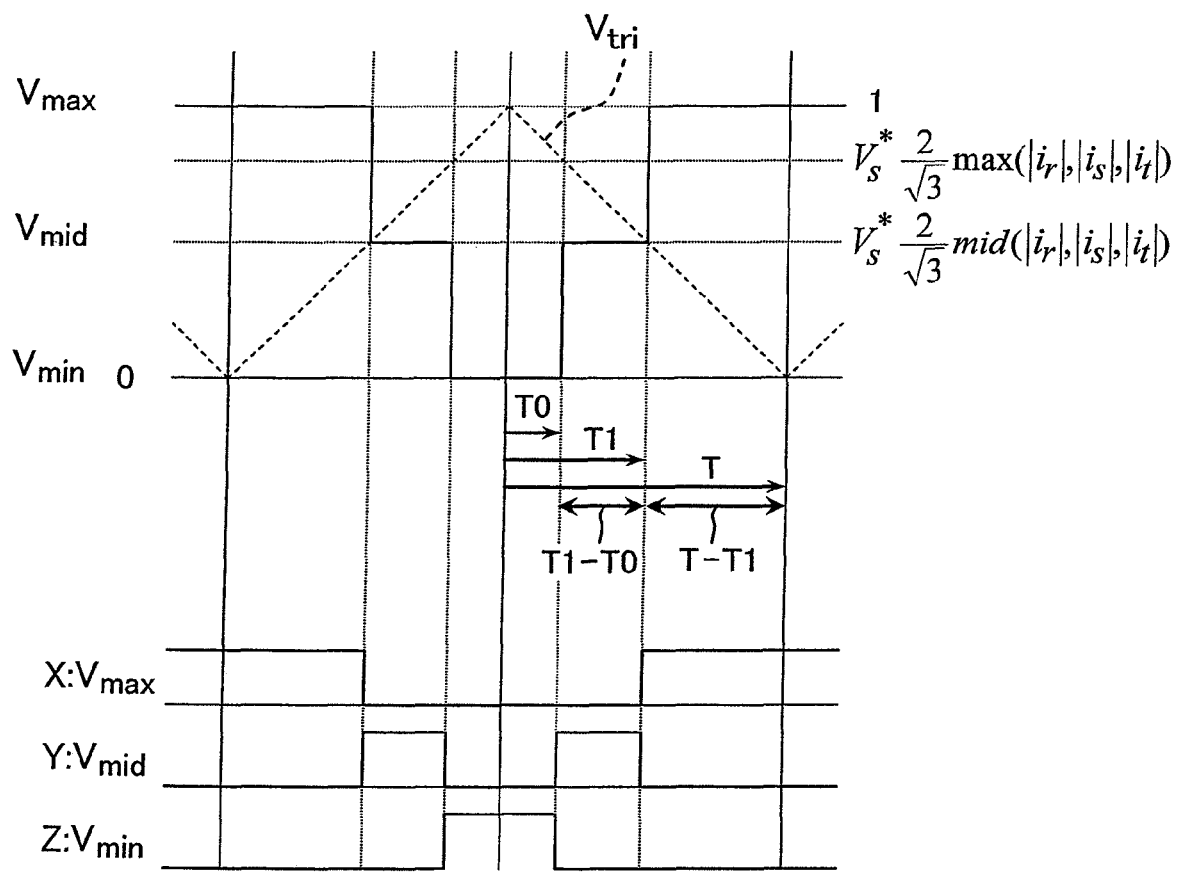
FIG. 4 is a chart showing turn-on timing of the matrix converter.

FIG. 4 shows a chart for explaining the conduction timing described above. At the conduction timing shown in FIG. 4, PWM modulation by carrier comparison is performed.

Next, it is shown that the same results as in the Comparative Example can be obtained by the method of the invention. It is noted that the power factor is assumed as 1, and the description will be given by phase voltage.

For intervals with the phase angle ranging from 30° to 60°, it follows that $$E_{max} = V_{max} - V_{min}$$
$$= V_r - V_t$$
$$= \frac{1}{\sqrt{3}}(\cos\theta_r - \cos\theta_t)$$
$$= \cos\phi$$
$$E_{mid} = V_{mid} - V_{min}$$
$$= V_s - V_t$$
$$= \frac{1}{\sqrt{3}}(\cos\theta_s - \cos\theta_t)$$
$$= \cos(\phi - \pi/3).$$

In this case, since $$a = \frac{\cos\theta_s}{\cos\theta_r}$$

$$\phi = \theta - \pi/6$$

$$V_r = \frac{1}{\sqrt{3}}\cos\theta_r$$
$$= \frac{1}{\sqrt{3}}\cos\theta$$

$$V_s = \frac{1}{\sqrt{3}}\cos\theta_s$$
$$= \frac{1}{\sqrt{3}}\cos\left(\theta - \frac{2\pi}{3}\right),$$

$$V_t = \frac{1}{\sqrt{3}}\cos\theta_t$$
$$= \frac{1}{\sqrt{3}}\cos\left(\theta + \frac{2\pi}{3}\right)$$

modifying Equation (1) results in $$\frac{1}{E_{max} + aE_{mid}} = \frac{1}{\cos\phi + \frac{\cos\theta_s}{\cos\theta_r}\cos(\phi - \pi/3)}$$
$$= \frac{\cos\theta_r}{\cos\theta_r\cos\phi + \cos\theta_s\cos(\phi - \pi/3)}$$
$$= \frac{\cos\theta_r}{\sin(\pi/3 - \phi)\cos\phi + \sin\phi\cos(\phi - \pi/3)}$$
$$= \frac{2\cos\theta_r}{\sin\pi/3 + \sin(\pi/3 - 2\theta) + \sin(2\theta - \pi/3) + \sin\pi/3}$$
$$= \frac{2}{\sqrt{3}}\cos\theta_r.$$

Accordingly, the mid phase flow ratio is $$\frac{a}{E_{max} + aE_{mid}} = \frac{2}{\sqrt{3}}\cos\theta_s$$

and the sum of flow ratios for the maximum phase and the mid phase is $$\frac{1+a}{E_{max} + aE_{mid}} = -\frac{2}{\sqrt{3}}\cos\theta_t$$

thus consistent with Equations (4), (5) and (6).

The matrix converter of the invention shown in FIG. 2, as compared with the matrix converter of the Comparative Example of FIG. 8, becomes constant in average virtual dc link voltage, eliminating the needs for blocks associated with the voltage ripple computation and the carrier amplitude modulation, so that its construction can be simplified.

Although Equations (4) and (6) are shown as blocks for determining current conduction ratios, yet it is also possible to further simplify the construction by looking up to a single sine table for the determination of mid and maximum values with the use of a phase angle $\phi$ within the region X or region Y:

$$\frac{2}{\sqrt{3}}\mathrm{mid}(|i_r^*|, |i_s^*|, |i_t^*|) = \frac{2}{\sqrt{3}}\sin(\pi/3 - \phi)(\text{where } \pi/6 > \phi \geq 0) \qquad (7)$$
$$= \frac{2}{\sqrt{3}}\sin\phi (\text{where } \pi/3 > \phi \geq \pi/6)$$

$$\frac{2}{\sqrt{3}}\max(|i_r^*|, |i_s^*|, |i_t^*|) = \frac{2}{\sqrt{3}}(\sin\phi + \sin(\pi/3 - \phi)). \qquad (8)$$

Also, a case with the power factor of 1 only is shown above, and the switching of the region X and Y is performed by referencing the polarity of the mid phase of the power supply voltage (three-phase ac input voltage). However, when the input power factor is variable, it is also possible to control the power factor by switching with a phase of the mid phase to which a phase difference is added.

In the matrix converter of the Comparative Example of FIG. 8, because the voltage command has a two-phase modulation waveform, the maximum phase and the mid phase out of the voltage command are subjected to PWM modulation, and apportioning to the individual phases is performed by using phase information θr. Further, as a measure for a case where the synchronism between power supply frequency and carrier frequency is not ensured, updating timing is limited to the reference voltage X/Y, the voltage command phase information θr and the power supply voltage phase information $V_{max}$, $V_{mid}$, $V_{min}$.

FIGS. 12A to 12D show timings at which distortion occurs in a case where the matrix converter of the Comparative Example is asynchronous. In this case, distortion occurs to three points of change, i.e. change of reference voltage, phase shift of the two-phase modulation waveform, and phase shift of the power supply voltage (current).

FIGS. 13A to 13D show effects on the above changes in individual switching states (maximum, mid and minimum) of the carrier cycle. These figures are shown by single-phase output for simplicity, where the phase having only one phase short-circuited by bold line is the 120° conduction phase of the two-phase modulation waveform while the other is any two phases. In the initial state, it is assumed that the maximum, mid and minimum voltages correspond to r phase, s phase and t phase, respectively.

(1) State of conduction to the maximum phase (shown in FIG. 13B)

As the reference voltage X/Y changes, voltage command values of U and V phases are inverted while switching signals of r and t phases are switched over. As a result, the state changes from X (+−) to Y (−+), whereas neither U nor V phase changes in switching state to the maximum and minimum phases.

In a case where the conduction phase and the switching phase have changed due to a phase shift of the voltage command phase information θr, switching between U phase and V phase causes the state to change from X(+−) to X(−+) so that the output changes from r phase to t phase.

With regard to the power supply voltage phase information $V_{max}$, $V_{mid}$, $V_{min}$, when the maximum phase and the mid phase of the input voltage have been switched (r phase ↔ s phase), the switch for the U phase to conduct changes from $S_{ur}$ to $S_{us}$.

(2) State of conduction in the mid phase (shown in FIG. 13C)

When the reference voltage X/Y has changed, the state changes from X(+−) to Y(−+), so that both U phase and V phase change in switching state.

As a result of a phase shift of the voltage command phase information θr, the state changes from X(+−) to X(−+), so that both U phase and V phase change in switching state.

As to the power supply voltage phase information $V_{max}$, $V_{mid}$, $V_{min}$, when the maximum phase and the mid phase of the input voltage have been switched, the switch for the U phase to conduct changes from $S_{us}$ to $S_{ur}$.

(3) State of conduction to the minimum phase (shown in FIG. 13D)

When the reference voltage X/Y has changed, the state changes from X(+−) to Y(−+), so that both U phase and V phase change in switching state.

As a result of a phase shift of the voltage command phase information θr, the state changes from X(+−) to X(−+), whereas the switching state does not change because both U phase and V phase are in the minimum phase.

With regard to the power supply voltage phase information $V_{max}$, $V_{mid}$, $V_{min}$, when the maximum phase and the mid phase of the input voltage have been switched, the switching state does not change because both U phase and V phase are in the minimum phase.

As shown above, in the matrix converter of the Comparative Example, because of the presence of a mode in which a change of the signals does not cause a change of the switching state, it is permitted to update the reference voltage X/Y during the period of conduction to the maximum phase (Top), and the voltage command phase information θr and the power supply voltage phase information $V_{max}$, $V_{mid}$, $V_{min}$ during the period of switching to the minimum phase (Bas), so that balance of current distribution within the carrier cycle is ensured. Also, for the updating periods therefor are used a voltage command mid phase signal that minimizes the conduction period to the power supply maximum phase (Top) as well as a voltage command maximum phase signal that minimizes the conduction period to the power supply minimum phase (Bas).

In the matrix converter of the Comparative Example, since the voltage command has a two-phase modulation waveform, the three-phase voltage command is not used, and only the maximum phase and the mid phase are subjected to PWM modulation, where phase information θr is used for apportioning to the individual phases. Therefore, not only the reference voltage X/Y and the power supply voltage phase information ($V_{max}$, $V_{mid}$, $V_{min}$), which are subject to update limitations to avoid distortions due to asynchronism, but also phase information needs to be subject to update limitation. Further, update control involves the use of two signal levels, i.e. a mid phase signal and a maximum phase signal, giving rise to a problem of complicated construction of the control system.

In the digital control of inverters, signal input and output are controlled in synchronization with the timing of PWM carrier cycles in order to take matching of signal delay time.

In this connection, in the matrix converter of the invention, on the assumption that a signal wave to be modulated is updated and held at the timing of a peak of the carrier signal as shown in FIG. 5, the signal is switched in a state of conduction to the minimum phase. In this case, the voltage command phase information θr and the power supply voltage phase information $V_{max}$, $V_{mid}$, $V_{min}$ correspond to updatable timings, whereas the invention uses the three-phase voltage command, containing phases, so that update control for the phase information θr becomes unnecessary. The power supply voltage phase information $V_{max}$, $V_{mid}$, $V_{in}$ is updated in synchronization with the timing of a peak of the carrier signal.

Figure 6A:
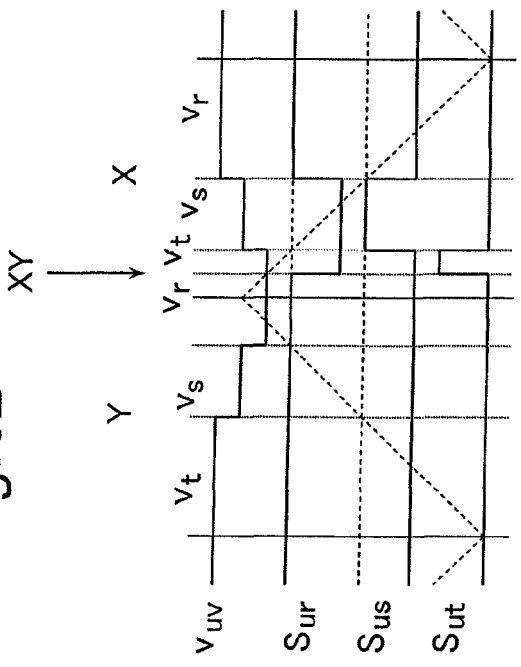
FIGS. 6A-6D are charts showing signal update timing of occurrence of distortion.
Figure 6B:
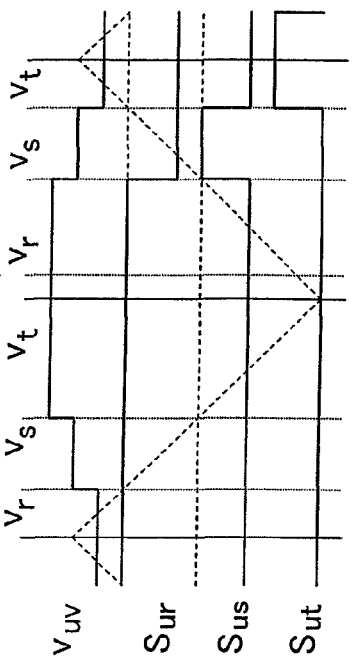
Figure 6C:
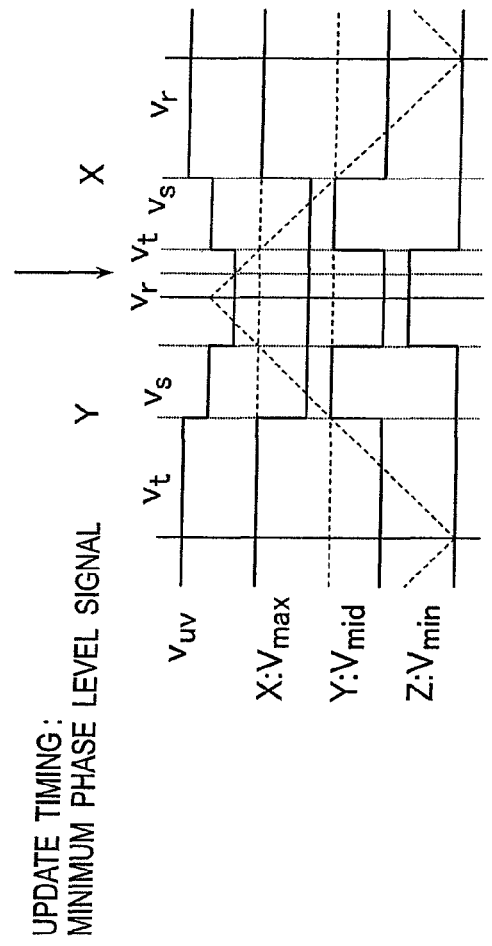
Figure 6D:
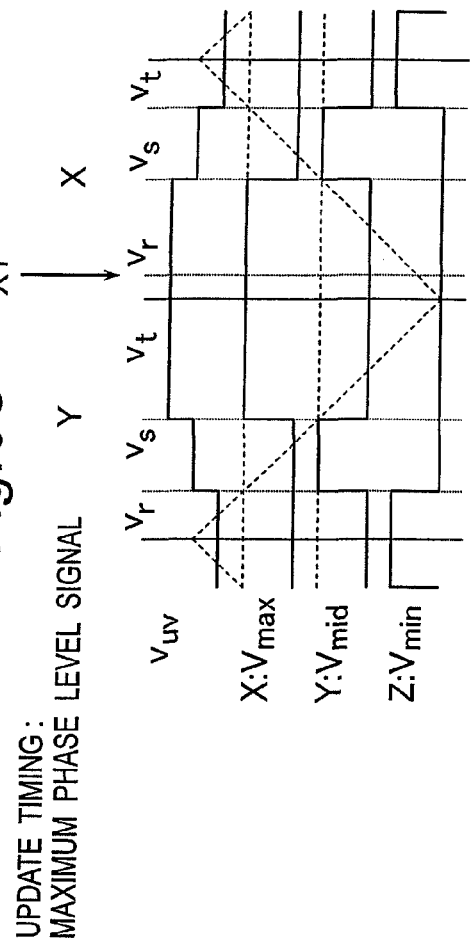

Also in this invention, the reference voltage X/Y is updated at the timing of a peak of the carrier signal as well. The timing of a peak of the carrier signal corresponds to the minimum phase, where update control would be performed by level signals, in conventional cases, so that the input current distribution within the carrier cycle is unbalanced as shown in FIGS. 6A and 6B. On the other hand, as to the update in the maximum phase, there occurs no changes in switching state with respect to the changeover of the reference voltage X/Y as shown in FIGS. 6C and 6D.

Figure 5A:
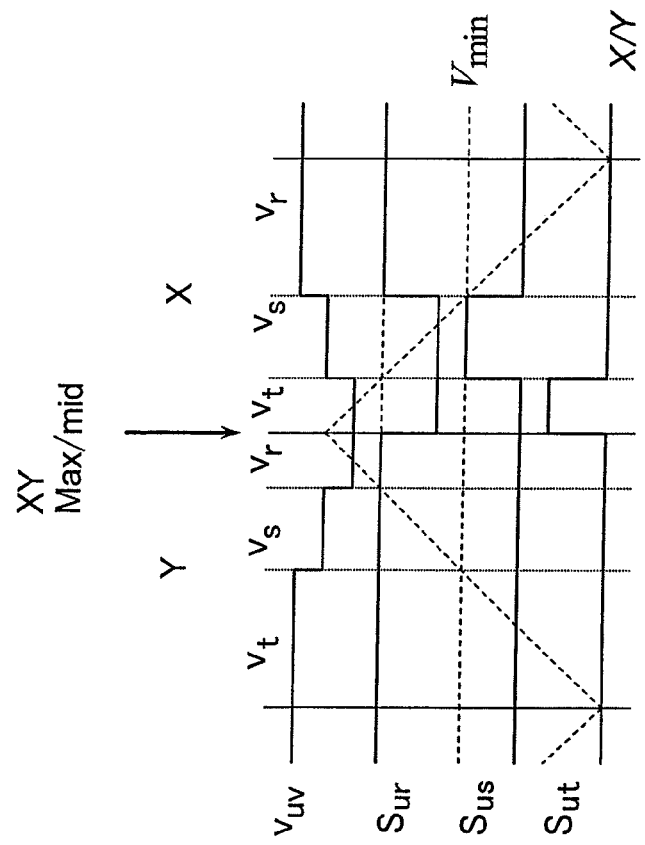
FIGS. 5A and 5B are charts of signal update timing of the matrix converter.
Figure 5B:
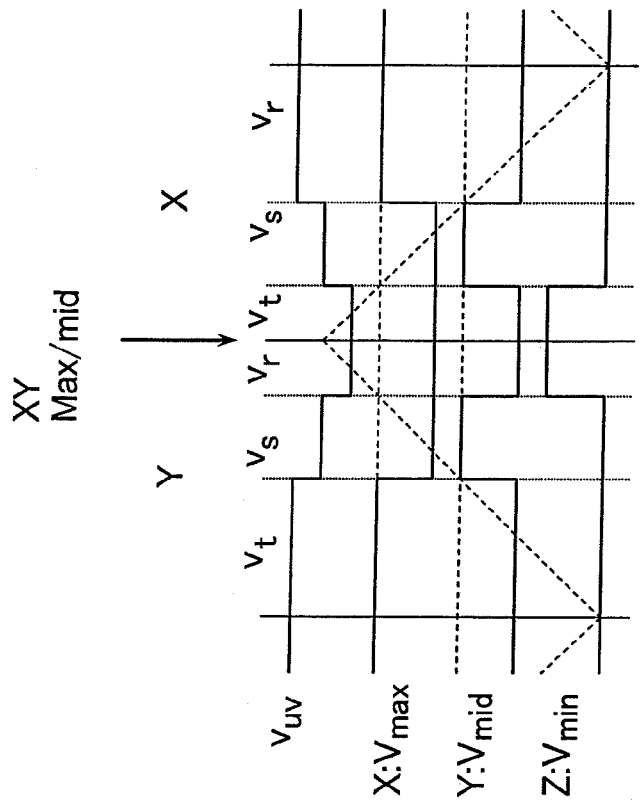

Changes in switching state by update timing in this invention are shown in FIGS. 5A and 5B. In this case, with respect to the minimum phase level signal, waveform update is performed at the timing of a peak of the carrier signal. As a result, whereas the switching state of the maximum phase and the minimum phase is changed, the waveform is maintained symmetrical, making it understood that current distribution of a half carrier cycle keeps equal, as compared with the updated waveform in the maximum phase.

As shown above, update of the reference voltage X/Y and the power supply voltage phase information $V_{max}$, $V_{mid}$, $V_{min}$ is synchronized at the timing of a peak of the carrier signal in which the voltage command is updated and held, thus making it possible to prevent occurrence of current distortions as well as to achieve simplification of the control-related construction.

Figure 7:
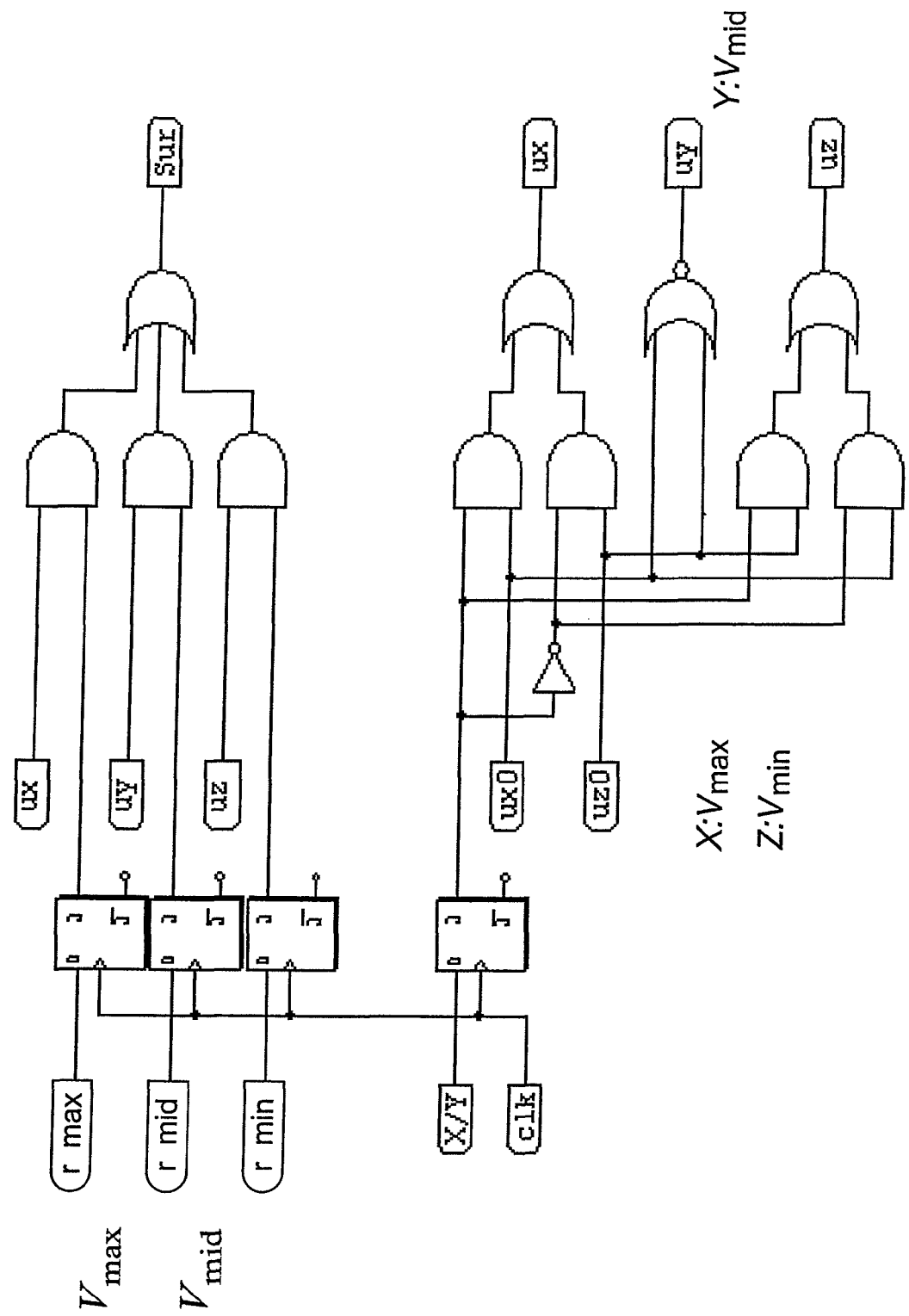
FIG. 7 is a diagram showing a logic circuit of a pulse pattern circuit.

In addition, the update of control information in the pulse pattern generating section 17 of FIG. 2 can be provided by using such a circuit as shown in FIG. 7 as an example.

According to the matrix converter of this embodiment, the average virtual dc link voltage is made constant by the modulation method with the use of input current flow ratio, eliminating the needs for ripple computation and computations for carrier amplitude modulation, so that the control-related construction can be simplified.

Further, the matrix converter is easily applicable to digital counters and comparators by virtue of its constant carrier amplitude, and suitable for digital control systems by virtue of its capability of maintaining the PWM modulation resolution constant.

Moreover, the matrix converter is enabled to reduce input current distortions even in cases of asynchronism of three-phase ac input voltage and carrier cycle, with a simple construction in which the output voltage command and the power supply voltage (current) information are updated and held at the timing of carrier peaks.

What is claimed is:

1. A matrix converter for converting a three-phase ac input voltage into a specified three-phase ac output voltage, the matrix converter comprising:
   an output voltage command signal generating section configured to generate an output voltage command signal to output the specified three-phase ac output voltage;
   a current flow ratio generating section configured to generate a signal representing a current flow ratio based on a specified input current command signal;
   a signal correcting section configured to correct the output voltage command signal based on the output voltage command signal generated by the output voltage command signal generating section and the signal representing the current flow ratio generated by the current flow ratio generating section;
   a PWM conversion signal generating section configured to generate a PWM conversion signal based on the output voltage command signal corrected by the signal correcting section and a carrier signal; and
   a conversion section configured to convert the three-phase ac input voltage into the specified three-phase ac output voltage based on the PWM conversion signal generated by the PWM conversion signal generating section, wherein
   given the input current command signals are represented by $i_r^*$, $i_s^*$, $i_t^*$ and a voltage command is represented by $V_s^*$, assuming the lowest voltage phase as a reference voltage when a polarity of a mid phase out of the output voltage command signal is positive or the highest voltage phase as a reference voltage when the polarity of the mid phase out of the output voltage command signal is negative, the current flow ratio generating section generates the current flow ratio of the maximum phase using $$V_s^* \frac{2}{\sqrt{3}} \mathrm{mid}(|i_r^*|, |i_s^*|, |i_t^*|)$$

and generates a sum of the current flow ratio of the maximum phase and the current flow ratio of the mid phase using $$V_s^* \frac{2}{\sqrt{3}} \max(|i_r^*|, |i_s^*|, |i_t^*|).$$

2. The matrix converter as claimed in claim 1, wherein
given that the input current command signals are represented by $i_r^*$, $i_s^*$, $i_t^*$ and that a phase angle of the input current command signals $i_r^*$, $i_s^*$, $i_t^*$ relative to the output voltage command signal is represented by φ, the current flow ratio generating section generates the current flow ratio of the maximum phase using $$\frac{2}{\sqrt{3}} \mathrm{mid}(|i_r^*|, |i_s^*|, |i_t^*|) = \frac{2}{\sqrt{3}} \sin(\pi/3 - \phi) \text{(where } \pi/6 > \phi \geq 0\text{)}$$
$$= \frac{2}{\sqrt{3}} \sin\phi \text{(where } \pi/3 > \phi \geq \pi/6\text{)}$$

and generates a sum of the current flow ratio of the maximum phase and the current flow ratio of the mid phase using $$\frac{2}{\sqrt{3}} \max(|i_r^*|, |i_s^*|, |i_t^*|) = \frac{2}{\sqrt{3}} (\sin\phi + \sin(\pi/3 - \phi)).$$

3. The matrix converter as claimed in claim 1, wherein the carrier signal is a triangle wave signal having a generally constant amplitude.

4. The matrix converter as claimed in claim 1, wherein the carrier signal is a sawtooth wave signal having a generally constant amplitude.

5. The matrix converter as claimed in claim 3, further comprising
a holding section configured to hold the output voltage command signal corrected by the signal correcting section and power supply voltage information, wherein
the holding section configured to update the output voltage command signal and the power supply voltage information at a timing of a peak of the carrier signal, and
the PWM conversion signal generating section configured to generate the PWM conversion signal based on the output voltage command signal and the power supply voltage information held by the holding section.

6. A matrix converter control method for converting a three-phase ac input voltage into a specified three-phase ac output voltage, the matrix converter control method comprising:
generating an output voltage command signal for outputting the specified three-phase ac output voltage;
generating a signal representing a current flow ratio based on a specified input current command signal;
correcting the output voltage command signal based on the output voltage command signal and the signal representing the current flow ratio;
generating a PWM conversion signal based on the corrected output voltage command signal and a carrier signal; and
converting the three-phase ac input voltage into the specified three-phase ac output voltage based on the PWM conversion signal, wherein
given the input current command signals are represented by $i_r^*$, $i_s^*$, $i_t^*$ and a voltage command is represented by $V_s^*$, assuming the lowest voltage phase as a reference voltage when a polarity of a mid phase out of the output voltage command signal is positive or the highest voltage phase as a reference voltage when the polarity of the mid phase out of the output voltage command signal is negative, the current flow ratio of the maximum phase is generated using $$V_s^* \frac{2}{\sqrt{3}} \mathrm{mid}(|i_r^*|, |i_s^*|, |i_t^*|)$$

and a sum of the current flow ratio of the maximum phase and the current flow ratio of the mid phase is generated using $$V_s^* \frac{2}{\sqrt{3}} \mathrm{max}(|i_r^*|, |i_s^*|, |i_t^*|).$$

7. The matrix converter as claimed in claim 4, further comprising
a holding section configured to hold the output voltage command signal corrected by the signal correcting section and power supply voltage information, wherein
the holding section is further configured to update the output voltage command signal and the power supply voltage information at a timing of a peak of the carrier signal, and
the PWM conversion signal generating section is further configured to generate the PWM conversion signal based on the output voltage command signal and the power supply voltage information held by the holding section.

* * * * *